(12) United States Patent
Scott

(10) Patent No.: US 10,078,255 B2
(45) Date of Patent: Sep. 18, 2018

(54) CAMERA SURVEILLANCE ASSEMBLY

(71) Applicant: Glenn M. Scott, Pittsburgh, PA (US)

(72) Inventor: Glenn M. Scott, Pittsburgh, PA (US)

( * ) Notice: Subject to any disclaimer, the term of this patent is extended or adjusted under 35 U.S.C. 154(b) by 0 days.

(21) Appl. No.: 14/999,995

(22) Filed: Jul. 25, 2016

(65) Prior Publication Data

US 2018/0024421 A1 Jan. 25, 2018

(51) Int. Cl.
*G03B 17/56* (2006.01)
*B25J 1/04* (2006.01)

(52) U.S. Cl.
CPC ............. *G03B 17/561* (2013.01); *B25J 1/04* (2013.01); *G03B 17/566* (2013.01)

(58) Field of Classification Search
None
See application file for complete search history.

(56) References Cited

U.S. PATENT DOCUMENTS

| 2003/0026446 A1* | 2/2003 | Davis | F16C 11/10 381/390 |
| 2004/0179891 A1* | 9/2004 | Watkins | F16C 11/10 403/96 |

* cited by examiner

*Primary Examiner* — Rochelle-Ann J Blackman
(74) *Attorney, Agent, or Firm* — Gary P. Topolosky

(57) ABSTRACT

A camera surveillance/inspection assembly and a unique coupling assembly are disclosed. The surveillance/inspection assembly includes a pair of selectively variable length rod members connected to each other by the selectively rotatable coupling. The coupling includes a pair of abutting rotatable members locked together by internal meshing annular toothed portions. The rotatable members and meshing toothed portions are selectively disengaged by depressing a spring urged connecting shaft. Rotation of either or both of the rotatable members will angularly orient the rod members with respect to each other.

6 Claims, 4 Drawing Sheets

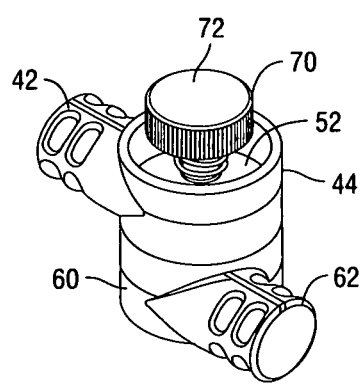
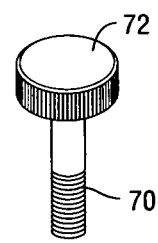
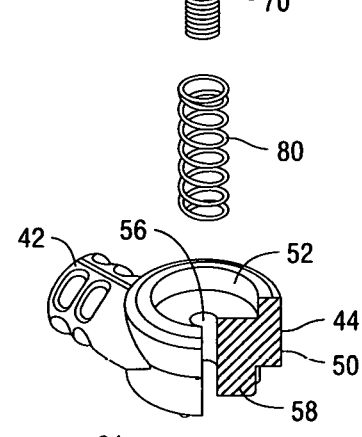
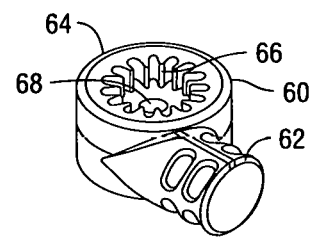
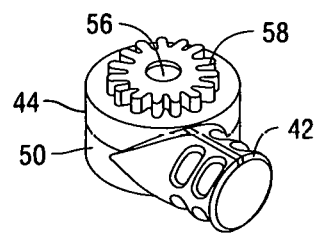
*Fig.3*
*Fig.4A*
*Fig.4*

CAMERA SURVEILLANCE ASSEMBLY

BACKGROUND OF THE INVENTION

1. Field of the Invention

This invention relates to a camera surveillance assembly which would be used for observing difficult to view surfaces of different apparatus such as the undersurface of vehicles or outersurfaces of equipment in close proximity to adjacent surfaces. The camera surveillance assembly includes rod members secured to each other by a coupling which allows positioning the rod members at various angles to each other.

2. Description of the Prior Art

There are a vast number of different designs of devices for observing difficult to view external surfaces of apparatus such as the undercarriage of vehicles. They are typically identified as inspection devices and commonly called pole-type vehicle inspection apparatus, vehicle inspection camera systems, camera supports, and such like. Different designs are disclosed in U.S. Pat. No. 5,959,792 of Abdalla M. Abraham for Powered Mirror Apparatus; U.S. Pat. No. 6,962,313 of Franklin J. Marks, Jr. for Camera Support Assembly and Actuator; Patent Application Publication US 2002/0097321 for Vehicle Inspection Camera Utilizing Infrared Diodes. They disclose different designs each of which is a structure allowing observation of difficult to view surfaces all of which designs are adapted to view the undersides of vehicles. The designs of the above disclosures use one or two rods with handles or the like for grasping and supporting the inspection devices and a fixture for supporting a camera or such like. In each design the assembly is held and supported with the camera section directed under the vehicle to view and/or photograph the underside structure of the vehicle. The inspection device of U.S. Pat. No. 5,959,792 incorporates a mirror on the view end section which is motorized to position the mirror at various angles. The mirror is coupled to a power source which is interconnected with a toggle switch which may be pushed to move the mirror to different angles with respect to the lower mirror supporting end of the assembly. The device of the Patent Application Publication US 2002/0097321 includes separate rod members, one of which includes handles for grasping and holding the entire assembly. A lower rod includes a support for a video camera and headgear having an eyepiece with a video screen mounted therein and a heavy battery pack, all of the viewing elements intended to be supported by the user by securing the combined viewing elements to the head and midsection of his body. The U.S. Pat. No. 5,959,792 and Patent Application Publication inspection devices are both unduly heavy and cumbersome requiring somewhat elaborate and complicated circuitry and parts, and in the case of the Patent Application Publication device, is awkward and difficult to use. The U.S. Pat. No. 5,959,792 device is limited in the extent of observation area since it uses a single rod with no provision for extending it or angling it to view areas of varying heights. Aside from an all too complex viewing system, the Patent Application Publication assembly uses two separate rod members coupled by an adjustable elbow, not clearly described, using a pair of circular plates with separable mating teeth which appear to be on the exposed periphery of the plates. Such an arrangement of the adjustable elbow, if understood, would expose the circular plates to the environment where the inspected vehicle would be located, the environment could be wet and damp subjecting the teeth to corrosion and rust, or to be clogged with suspended matter often found in garages and repair shops.

Another inspection device is disclosed in U.S. Pat. No. 6,962,313 and is similar to the device of U.S. Pat. No. 5,959,792 using a single Z-shaped rod with a camera support at its lower end section. The camera is connected with an actuator and mounted in the upper handle section of the rod, the camera being connected by a cable through a shaft to the actuator. The actuator includes a shaft arranged internally of an upper section of the rod, the shaft in turn is connected with the cable secured to the camera support. The camera is positioned by manually pushing or pulling the actuator. As with the U.S. Pat. No. 5,959,792 inspection device, the U.S. Pat. No. 6,962,313 device is significantly limited in the extent of observation area due to its single Z-shaped rod construction. Also, the U.S. Pat. No. 6,962,313 actuation system is unduly complex and fails to provide a wide range of positioning of the camera.

All of the above inspection device designs, aside from being complex with respect to their respective viewing systems, are bulky, heavy, and awkward in their use and not conveniently stored when not used. The user of an inspection device would want to carry a reasonable light weight device which could be compacted when not used and which would be capable of positioning the viewing element over virtually the entire under surface of an inspected vehicle and would not be subject to environmental corrosion, as well as being relatively inexpensive to purchase. The known inspection devices, as described above, would not satisfy a user's desires and thus the described devices are not known to be used anywhere.

The above described devices are not readily useable for inspection/observing difficult to observe external surfaces of apparatus some or all of the external surfaces being in close proximity to other apparatus or walls, floors, or ceilings of the place of the apparatus. For example, HVAC units, boilers, motors, to name a few, could be located in tight arrangement and could not have some of their external surfaces conveniently inspected/observed by the afore-described inspection devices which are peculiarly limited to inspecting the underside or undercarriage of motor vehicles, albeit ineffectively and inefficiently.

The present invention overcomes the drawbacks and problems inherent in known designs of inspection/surveillance devices, as previously described, by providing a camera surveillance device which is simple in structure combining relatively few parts, is lightweight and capable of being compacted for ease of carrying or storing, as well as being relatively inexpensive to purchase, and protected from corrosion, rust, or clogging by corrosive or suspended matter often found in repair shops and industrial areas. This invention includes variable length rod members which may be selectively adjusted in length secured together by a unique selectively rotatable coupling with totally enclosed and protected meshing and unmeshing locking teeth. The locking teeth are simply and effectively unmeshed by the actuation of a member by a simple operation allowing the respective rod members or one of them to be angularly oriented to each other. The surveillance/inspection device of this invention is also designed for readily viewing difficult to observe external surfaces of apparatus other than the undersurface/undercarriage of vehicles. In other words, the surveillance/inspection device of this invention is universal in scope for observing difficult to view external surfaces of apparatus.

SUMMARY OF THE INVENTION

The present invention provides a camera surveillance or inspection assembly which includes an elongated selectively variable length first rod member having proximal and distal end sections shaped and sized for grasping and holding the assembly. The same assembly has preferably a second selectively variable length second rod member having proximal and distal end sections shaped and sized for supporting at its distal end section a visual recording device. The rod members are secured to each other by a selectively movable coupling having internal locking and unlocking means, the coupling being shaped and constructed for angularly orienting the first and second rod members with respect to each other.

In one form of the present invention at least the first rod member is comprised of at least two selectively slideably moveable telescoping sections longitudinally connected to each other and longitudinally moveable with respect to each other to vary the length of the first rod member. The second rod member may also be constructed similarly of at least two selectively slideably loving telescoping sections longitudinally connected to each other and longitudinally moveable with respect to each other to vary the length of the second rod member. More than one pair of selectively moveable telescoping sections may be included in the first and second rod members, or either of them.

The coupling securing the first and second members preferably includes an upper first hollow rotatable member and a lower second hollow rotatable member selectively removably engaging each other coaxially about an axis generally perpendicular to each of the respective longitudinal axes of the first and second rod members. The rotatable members are arranged to be selectively disconnected by depressing a spring urged connecting shaft extending through the confines of the rotatable members. The shaft is secured by its lower end fixed to the lower end section of the second or lower rotatable member, and by depressing the shaft the second or lower rotatable member is moved away from the first or upper rotatable member allowing either or both the upper and lower rotatable members to be rotated and the first and second rod members in turn rotated to angularly orient the first and second rod members with respect to each other. The upper and lower members of the coupling are preferably secured to each other by internal annular toothed portions fixed respectively to inner sections of the upper and lower rotatable members. By depressing the connecting shaft, as described above, the rotatable members and the toothed portions are separated unlocking the upper and lower rotatable members for rotation as desired. A compression helical spring is preferably arranged between the bottom portion of the upper rotatable member and the head of the shaft for urging the upper rotatable member into engaging the lower rotatable member and into locking the rotatable members by meshing the respective toothed portions. Simple depressing of the connecting shaft unlocks the rotatable members allowing rotation of either or both. Releasing the depressing force will urge the upper and lower rotatable members into engagement and the meshing of the toothed members which will secure the rotatable members to each other.

Various advantages, details and modifications of the camera surveillance assembly and unique coupling of the present invention, will become apparent and indicated as the following description of a certain preferred embodiments and modifications of both proceed.

BRIEF DESCRIPTION OF THE DRAWINGS

In the accompanying drawing I show certain preferred embodiments of my present invention of my camera surveillance assembly and coupling assembly in which:

FIG. 3 is an enlarged perspective view of the connecting coupling;

FIG. 4 and FIG. 4A are perspective views of the elements of the coupling of FIG. 3 with the elements thereof separated and cut away in FIG. 4 to show details of construction;

DESCRIPTION OF PREFERRED EMBODIMENTS

Figure 1:
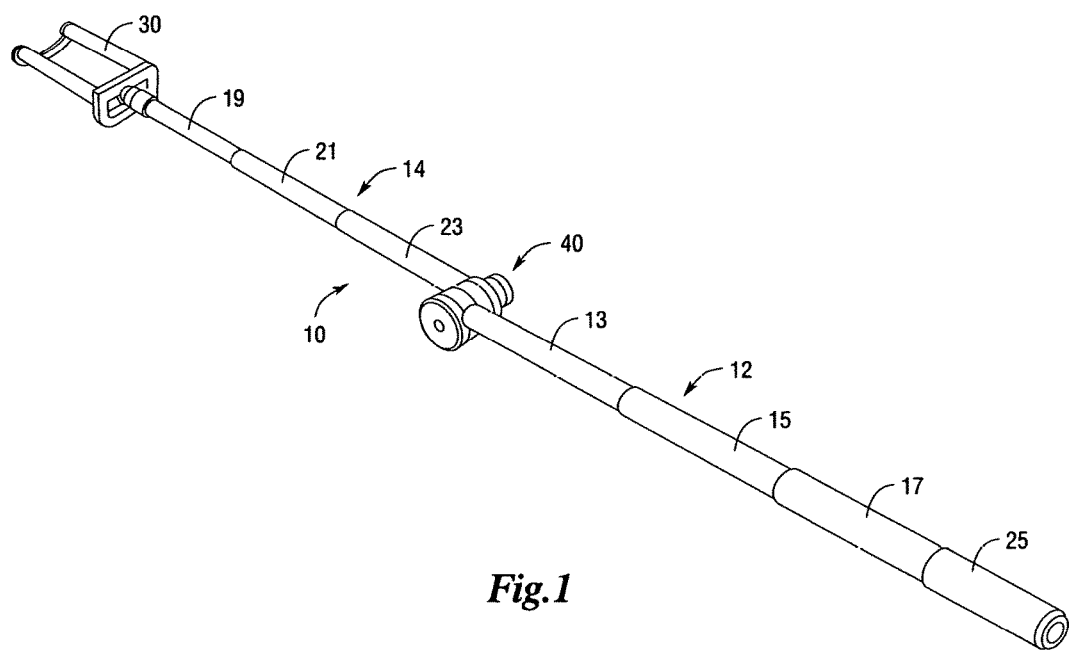
FIG. 1 is a perspective view of the camera surveillance assembly of the present invention showing the variable length connected rod members extended to full length.
Figure 2:
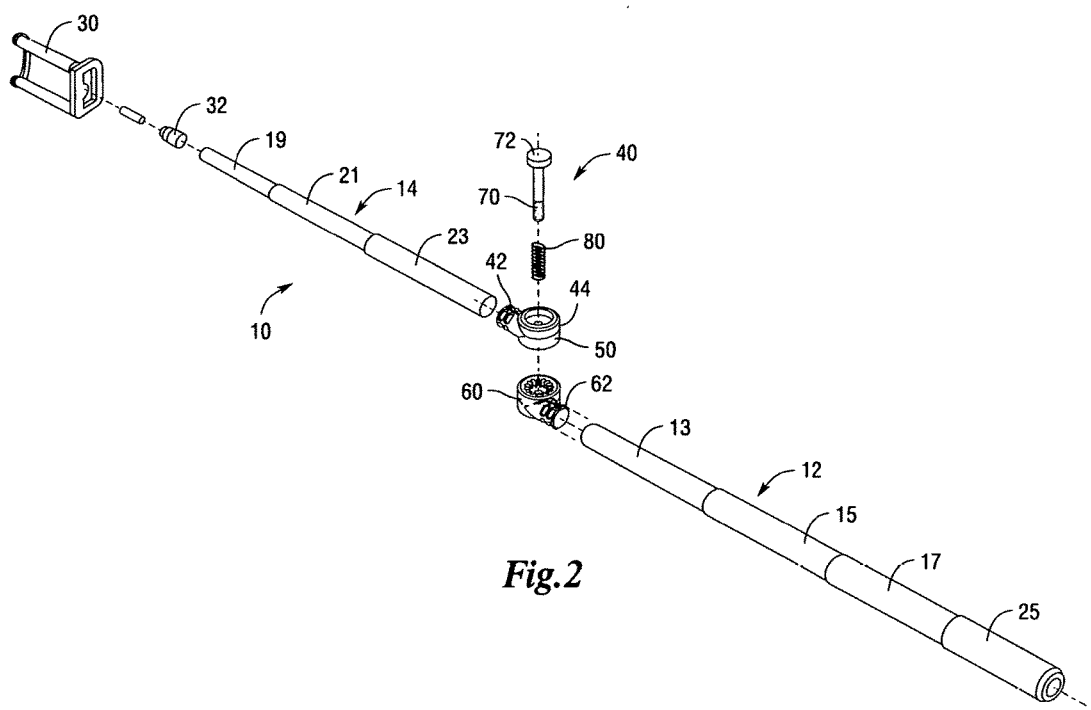
FIG. 2 is a perspective view of the same camera surveillance assembly with elements of the connecting coupling and the connection elements for the camera holder separated to show details of construction.
Figure 5:
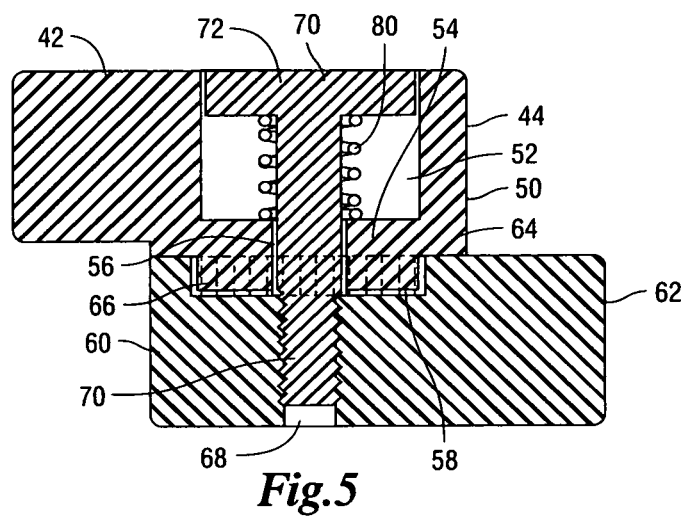
FIG. 5 is a cross sectional view of the coupling of the present invention showing the elements thereof in place with the rotatable members in engagement and secured in place.
Figure 6:
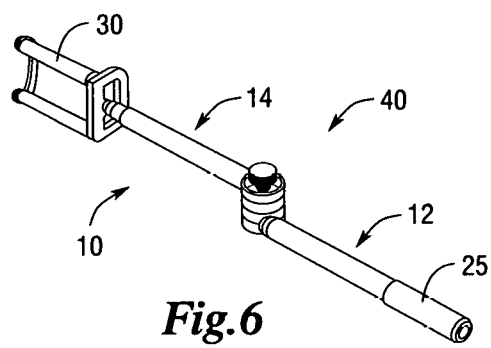
FIG. 6 is a perspective view of the camera surveillance assembly of the present invention showing the rod members retracted to their minimum overall length.

Referring now to the drawings there is shown a camera surveillance assembly 10, also referred to as an inspection device, and coupling assembly 40 of the present inventions. The surveillance assembly including a first elongated variable length rod member 12 connected at its distal end to a radically extending finger 62 of a second hollow rotatable member 60 of the coupling 40. A second elongated variable length rod member 14 is connected at its proximal end to a radically extending finger 42 of a first hollow rotatable member 50 of the coupling 40. Alternate pairs of first rod sections 13 and 15 and 15 and 17 are slideably arranged for selectively moving the first rod sections with respect to each other for adjusting the overall length of the first rod member 12. Similarly, alternate pairs of second rod sections 19 and 21 and 21 and 23 are slideably arranged for selectively moving the second rod sections with respect to each other for adjusting the overall length of the second rod member 14. A handle 25 is arranged on the proximal end of the first rod member 12 for gripping by the user when supporting the assembly 10 and coupling 40. A camera support bracket 30 is selectively rotatably supported by the distal end section of the second rod member 14. The bracket 30 may be of any known design for removably supporting a visual device such as a camera, iPhone or such like device which would see and record the surface being observed or inspected upon setting the device to record or upon voice command. As shown in FIG. 2, the bracket 30 is connected to the second rod member 14 by a rotatable plug 32 allowing the bracket 30 to be rotated and fixed within a limited circular arc range. The rod sections 13 and 15 and 15 and 17 are held in place with respect to each other by a ball and detent combination, not shown, but well known in structure. A simple twist of the rod section 13 and 15 and 15 and 17 will separate the ball from the detent allowing the rod sections to be longitudinally moved/slid with respect to each other for varying the overall length of the first rod member 12. The overall length of the second rod member 14 could be selectively varied by simple twisting of the rod sections 19 and 21 and 21 and 23 separating a ball from a detent and longitudinally moved/slid with respect to each other. FIG. 6 shows the camera surveillance assembly 10 with the first rod member 12 and second rod member 14 retracted to their respective minimum lengths. The coupling 40, to be described in detail, would allow the rod members 12 and 14 to be rotated into a compact side-by-side arrangement for ease of carrying and effective storing of the surveillance assembly 10.

The coupling assembly 40 also referred to coupling 40, is constructed for angularly orienting the first rod member 12 and second rod member 14 with respect to each other. The coupling 40 includes a first elongated hollow first rotatable member 50 having an exposed circular cross section upper section 52 and a downwardly extending lower section 54 defining a through cylindrical opening 56 communicating with the hollow upper section 52. Arranged on lower end of the lower section 54 is a radically outwardly extending annular first toothed portion 58 in a complete circular pattern.

The coupling 40 further includes a second hollow rotatable member 60 shaped and sized for the upper section 64 thereof to abut the lower section 54 of the first rotatable member 50, as shown in the drawings. Provided in the upper section 64 of the second rotatable member 60 is a radially inwardly extending annular second toothed portion 66 in a complete circular pattern sized and shaped for meshing with the first toothed portion 58 of the first rotatable member 50, when the first rotatable member 50 and second rotatable member 60 are engaging each other. The second toothed portion 66 defines a longitudinally extending threaded through opening 68 communicating with the hollow upper section 52 and cylindrical opening 56 of the first rotatable member 50. Disposed within and through the hollow upper section 52 of the first rotatable member 50, and the threaded through opening 68 of the second rotatable member 60 is a threaded connecting shaft 70 having cylindrical knob 72 fixed at the upper end thereof and shaped and sized to fit within the upper section 52 of the first rotatable member 50, and the lower end of the shaft threadedly secured in the threaded opening 68 of the second rotatable member 60. The connecting shaft 70 is fixed to the second rotatable member 60.

A biasing member 80 in the form of a helical spring, the biasing member referred to as helical spring 80, in compression surrounds the connecting shaft 70 with the upper end of the helical spring 80 engaging the lower surface of the knob 72 and its lower end engaging the under surface of the lower section 54 of the first rotatable member 50. The helical spring 80 impresses a longitudinal directed force on the first rotatable member 50 to engage it with the second rotatable member 60, as shown in the drawings. Pressing on the knob 72 will compact the helical spring 80 and will urge the connecting shaft 70 from its original position to longitudinally move the second rotatable member 60 and separate it from the first rotatable member 50 and separate the originally meshed first toothed portion 58 and second toothed portion 66, allowing either or both of the first rotatable member 50 and second rotatable member 60 to be rotated about their common longitudinal axis.

It should be clearly understood that the variable length first rod member 12 and second rod member 14 may be simply and easily angularly oriented with respect to each other by simply depressing the connection shaft member 70 against the compression force of the helical spring 80 to separate the first rotatable member 50 from the second rotatable member 60 unlocking them by the separation of the originally meshed first toothed portion 58 and second toothed portion 66, and rotating either or both the first rotatable member 50 and/or second rotatable member 60. In rotation of the first rotatable member 50 and/or second rotatable member 60, the angular orientation of the first rod member 12 and second rod member 14 is established.

The camera surveillance/inspection assembly and the unique coupling assembly both of the present invention provides together a lightweight, compact, relatively inexpensive device for observing difficult to view surfaces of different apparatus including, but not limited to, vehicles. Because of its variable length rod elements the assembly allows an inspection over a wide range of surface lengths with the length adjustments of the rod members thereof achieved by a simple and quick adjustment of the length of the rod members. Angular orienting of the rods to each other is achieved by a quick and simple separation of the elements of the coupling to allow their rotation. The unique coupling combines few elements with the locking arrangement being totally internal and protected from corrosion and jamming by the makeup of the environment where the inspections of the surfaces would be conducted. The introduction of this specification notes the advantages and new results of the surveillance/inspection device and unique coupling of this present invention.

While I have described certain present preferred embodiments of my inventions, it is to be distinctly understood that the inventions are not limited thereto but may be otherwise embodied within the scope of the following claims.

What is claimed is:

1. A camera surveillance assembly, comprising:

an elongated, axially rotatable and telescopically variable in length first rod member means having a proximal end section and a distal end section for grasping and holding said assembly;

an elongated, axially rotatable and telescopically variable in length second rod member means having a proximal end section and a distal end section for supporting at its distal end section a visual recording device;

a selectively moveable coupling means having internal locking and unlocking means for securing the proximal end section of said first rod member means to the the proximal end section of said second rod member means for variably orienting the angle of the proximal end of said first rod member means relative to the proximal end of said second rod member means, said coupling means including a first hollow rotatable member means and a second hollow rotatable member means selectively removably engaging each other coaxially about a longitudinal axis generally perpendicular to each of the respective longitudinal axes of said first rod member means and said second rod member means for selectively disengaging and rotating either or both of said first rotatable member means and said second rotatable member means for angularly orienting said first and second rod member means with respect to each other, said internal locking and unlocking means including said first rotatable member means having an exposed upper section and an internal lower section having arranged internally thereof a first annular toothed portion; and wherein said second rotatable member means has an upper section generally shaped and sized to abut said lower section of said first rotatable member means and having said upper section including therein a second annular toothed portion shaped and sized to removably engage said first annular toothed portion when said first rotatable member means and said second rotatable member means are engaging each other; and further including an elongated connective shaft member means having upper and lower end portions extending from said upper section of said first rotatable member means into the interior thereof and into the interior of said second rotatable member means and fixed to a portion of the lower section of said second rotatable member means and for selectively moving longitudinally of said first shaft member means for disengaging said first and second toothed portions and said first and second rotatable members allowing rotation of either or both said first rotatable and second rotatable member means; and biasing means urging a force for engaging said first and second rotatable member means and for engaging said first and second toothed portions, said biasing means being: (i) a helical coil spring in compression having upper and lower end sections urging said first rotatable member into engagement with said second rotatable member.

2. The camera surveillance assembly as set forth in claim 1 wherein said second rotatable member means has centrally disposed opening in its lower section generally coaxial with the longitudinal axis of said second rotatable member means; and wherein said connecting shaft member means has its lower end portion engaging and fixed in said opening; and wherein selectively depressing said connecting shaft from an original position against the urging force of said biasing means will axially disengage said second rotatable member means from said first rotatable member means and disengage said first and second toothed portions allowing rotation of said first and second rotatable member means; and further wherein releasing said connecting shaft member means to return to its original portion will urge said first and second toothed portions into engagement to fix the first and second rotatable member means to each other.

3. The camera surveillance assembly as set forth in claim 1 wherein said helical coil spring surrounds said connecting shaft member means with the upper section of said spring engaging an upper section of said connecting shaft and the lower section of said spring engaging an interior portion of the lower end section of said first rotatable member means to urge a force in the direction of said second rotatable member means for engaging said first and second rotatable member means and for meshing said first and second toothed portions.

4. A coupling assembly for joining oppositely arranged, telescopically extendable elongated members and for selectively angularly orienting the elongated members with respect to each other, said coupling assembly suitable for use as a camera surveillance assembly, comprising:

a first telescopically extendable elongated hollow rotatable member means and a second telescopically extendable elongated hollow rotatable member means, each rotatable member means having respectively upper and lower sections with a lower section of the first rotatable member means selectively removably engaging to an upper section of the second rotatable member means about a longitudinal axis of both of said first rotatable member means and said second rotatable member means so as to form a variably adjustable angle therebetween;

said first rotatable member means having its upper sections thereof exposed and its lower section having arranged internally therein a first annular toothed portion;

said second rotatable member means having its upper section thereof generally shaped and sized to abut said lower section of said first rotatable member means, said upper section of said second rotatable member including internally therein a second annular toothed portion shaped and sized to removably engage with said first annular toothed portion of said first rotatable member means when said first and second rotatable member means are engaging with each other, said second rotatable member means having a lower section adapted for serving as a camera surveillance assembly;

biasing means engaging said first rotatable member means urging a force for engaging said first and second rotatable member means said first and second toothed portions, said biasing means being a helical coil spring in compression to urge said fast and second rotatable member means into engagement; and actuator means for selectively moving said biasing means for disengaging said first and second rotatable member means and said first or second toothed portions allowing rotation of said first and second rotatable member means, said actuator means including a button activated, elongated connecting shaft member means extending from said upper section of said first rotatable member means into the interior thereof and into the interior of said second rotatable member means and fixed to a portion of the lower section of said second rotatable member means and selectively movable longitudinally of said first rotatable member means for disengaging said first and second rotatable members and said first and second toothed portions for allowing rotation of either or both said first rotatable and second rotatable member means and changing the relative angle therebetween.

5. The coupling assembly as set forth in claim 4 wherein said second rotatable member means has a centrally disposed threaded opening in its lower section generally coaxial with the longitudinal axis of said second rotatable member; and wherein said connecting shaft member means is threaded with its lower end threadedly engaging said threaded opening; and wherein selectively moving the button of said connecting shaft member means longitudinally in one direction will axially move said second rotatable member means and said first and second toothed portions; and further wherein moving the button of said connecting shaft member in a direction opposite of said one direction will urge said first and second rotatable member means and said first and second toothed portions into engagement with each other and to fix the first and second rotatable member means to each other.

6. The coupling assembly as set forth in claim 4 wherein said helical coil spring surrounds said connection shaft member means with a lower end section thereof engaging an interior portion of the lower end section of said first rotatable member means and urges a force in direction of the upper section of said second rotatable member means for engaging said first and second rotatable member means and said first and second toothed portions.

* * * * *